United States Patent [19]

Koski et al.

[11] 4,404,300

[45] Sep. 13, 1983

[54] POLYSTYRENE PROCESS

[75] Inventors: Unto K. Koski; Hamdy Khalil; Adrian Cassola, all of Sarnia, Canada

[73] Assignee: Polysar Limited, Ontario, Canada

[21] Appl. No.: 348,771

[22] Filed: Feb. 16, 1982

[51] Int. Cl.³ .................................................. C08K 5/34
[52] U.S. Cl. ........................................ 524/91; 524/84; 525/256
[58] Field of Search ..................... 524/91, 84; 525/256

[56] References Cited

U.S. PATENT DOCUMENTS 3,393,153 7/1968 Zimmerer et al. ...................... 524/91
3,994,990 11/1976 Foote .................................... 524/91

OTHER PUBLICATIONS

"Fluorescent Whitening Agents in the Paper Industry", TAPPI/Jul. 1981, vol. 64, No. 7, pp. 87–89.

Primary Examiner—Joseph L. Schofer
Assistant Examiner—N. Sarofim
Attorney, Agent, or Firm—Stevens, Davis, Miller & Mosher

[57] ABSTRACT

A process is provided for the production of an improved impact polystyrene by the use of a polybutadiene which contains an optical brightener as the rubber to be dissolved in the styrene monomer, following which the polybutadiene-styrene solution is polymerized.

5 Claims, No Drawings

POLYSTYRENE PROCESS

BACKGROUND OF THE INVENTION

This invention is directed to an improved process for the preparation of impact polystyrene wherein polybutadiene used in the process contains an optical brightener.

Impact polystyrene differs from polystyrene in that it contains a small amount of a rubbery polymer. The early forms of impact polystyrene were produced by mechanically blending polystyrene with the rubbery polymer, which was usually a styrene-butadiene polymer prepared by emulsion free radical polymerization. An improved method of preparing impact polystyrene required the rubbery polymer to be dissolved in the styrene monomer and the so-formed solution was subjected to polymerization. More recent requirements of the market place include the absence of discoloration for white grades of impact polystyrene.

SUMMARY OF THE INVENTION

It is an objective of this invention to provide an improved process for the preparation of impact polystyrene.

The present invention provides an improved process for the preparation of impact polystyrene wherein polybutadiene is dissolved in styrene monomer and the resulting solution containing from about 1 to about 15 weight percent of polybutadiene based on the weight of polybutadiene plus styrene monomer is polymerized by a thermal process with or without added free radical polymerization initiators, said polymerization being such as to achieve 85 percent or more conversion of the styrene monomer to polymer, the improvement being that at least part of the polybutadiene contains from about 75 to about 300 parts per million by weight of the polybutadiene of an optical brightener selected from aryl substituted triazole substituted aryl coumarins and bis(benzoxazolyl) substituted thiophenes.

DETAILED DESCRIPTION OF THE INVENTION

The polybutadiene used in the present invention is desirably one having a high 1,4-content, that is a 1,4-content of at least about 80% and preferably at least 85%. Suitable such polymers are commercially available and may be prepared with an alkyl-lithium catalyst, in which case the 1,4-content of the polymer is from 85% to about 90%, or with Ziegler catalysts, in which case the 1,4-content of the polymer is from about 92% to about 99%. Mixtures of such polymers may also be used.

The polymerization of styrene monomer is well known in the art. The polymerization is a thermal process, that is it is at a temperature higher than ambient, and free radical polymerization initiators may optionally be used. Polymerization may be at a temperature above about 80° C. and frequently is undertaken in a programmed manner wherein the temperature is maintained constant for a period of time and then raised to a higher temperature and held for another period of time and the raising of the temperature repeated a number of times. Temperatures above about 200° C. are seldom used except in the terminal stages especially prior to removal of residual styrene monomer. Free radical polymerization initiators include peroxides such as benzoyl peroxide and lauryl peroxide and azo compounds such as azo bis isobutyronitrile. Chain transfer agents, such as mercaptans, may also be added to assist in the control of molecular weight. Inert diluents such as ethylbenzene and hydrocarbon oils may also be added. The polymerization is usually started as a bulk reaction: after phase inversion has occurred, the polymerization may be continued in bulk or the polymer solution may be suspended in an aqueous medium and the polymerization continued therein. The quantity of polybutadiene dissolved in the styrene monomer is from about 1 to about 15 weight percent of the polybutadiene plus styrene monomer. The styrene monomer is converted to polymer to the extent of 85 percent or more and any unreacted styrene is removed from the polymer by methods well known in the art such as vacuum devolatilization.

At least part of the polybutadiene to be dissolved in the styrene monomer contains an optical brightener. Accordingly, if a single type of polybutadiene is used all or part of such polymer will contain optical brightener. If a mixture of types of polybutadiene is used only one or more or all of the types of polybutadiene may contain optical brightener. The quantity of optical brightener present in the polybutadiene will be from about 75 to about 300 parts per million by weight of the polybutadiene. The quantity of optical brightener in the final impact polystyrene is desirably from about 5 to about 10 parts per million by weight of the impact polystyrene. One method of incorporating the optical brightener in the polybutadiene is to add it during the polybutadiene manufacturing process such as together with the antioxidant or antioxidants normally added to the polymer. Alternatively, the optical brightener may be added to the polybutadiene before it is packaged for sale.

Suitable optical brighteners are selected from aryl substituted triazole substituted aryl coumarins and bis(benzoxazolyl) substituted thiopenes. Preferred optical brighteners include 7[2H-naphtho(1,2,-d-)triazol-2-yl]-3-phenyl coumarin, 7[5'-methyl-6'-n-butoxybenzotriazole-(2)]-3-phenyl coumarin and 2,5-bis[5'-tertbutyl benzoxazolyl(2')]-thiophene also known as 2,2'-(2,5-thiophenediyl)bis[5-tert-butylbenzoxazole].

The following example illustrates the invention.

Example

Polybutadiene was prepared by reaction of butadiene with a cobalt octoate-aluminum diethyl chloride-water catalyst to yield polymer having a cis-1,4 content of about 96%, a molecular weight expressed as the Mooney (ML 1+4@100° C.) of 38 and containing about 85 parts per million of LEUCOPURE ® EGM which is believed to be 7[2H-naphtho(1,2,-d-)-triazol-2-yl]-3-phenyl coumarin. A solution of the polymer in styrene was made up:
Styrene: 2225 g
Polymer: 250 g
Mineral Oil: 25 g
Mercaptan: 0.75 g
Butylated Hydroxy Toluene: 2.5 g
This solution was transferred under nitrogen pressure to a one gallon reactor equipped with an anchor stirrer and temperature controller system. With the agitator operating at 50 rpm the temperature was increased to 123° C. and held at that temperature for 4 hours at which time the conversion was about 23%. The reactor was cooled to about 85° C., 2.5 g of tert-butyl perbenzoate added and the contents of the reactor were transferred by nitrogen pressure to a second reactor. The second reactor was a closed 2 gallon reactor equipped with an agitator and a temperature control system and contained, before transfer of the contents of the first reactor, the following solution:

Water: 3000 g
Polyvinyl Alcohol: 3 g
Sodium Chloride: 18 g
Alkyl Aryl Sulphonate: 0.45 g The agitator was set at 600 rpm and the temperature was adjusted according to the following schedule:

95° C. for 1 hour
105° C. for 1 hour
115° C. for 1 hour
125° C. for 1 hour
140° C. for 2 hours
150° C. for 4 hours.

at the end of which the conversion was about 99.8%. The contents of the reactor were cooled, removed from the reactor, the impact polystyrene was filtered off and water washed then dried in an air circulating oven at a temperature of about 70° C.-impact polystyrene Sample A.

A second polymerization was run as a control in a duplicate manner except that the polybutadiene contained no LEUCOPURE, the product being identified as impact polystyrene Sample B.

The polystyrene Sample B obtained in the control polymerization had a faint yellow discoloration which was readily apparent to the eye whereas the polystyrene Sample A obtained in the experiment had a white appearance with no sign of discoloration. The physical properties of both polystyrenes were essentially the same—that is, for Sample A, the tensile strength at break was 236 kg/cm$^2$, the elongation at break was 59%, the flexural modulus was $1.96 \times 10^4$ kg/cm$^2$ and the Izod impact at room temperature was 2.3 mN and for Sample B, the tensile strength at break was 284 kg/cm$^2$, the elongation at break was 52%, the flexural modulus was $2.2 \times 10^4$ kg/cm$^2$ and the Izod impact at room temperature was 2.4 mN.

What is claimed is:

1. An improved process for the preparation of impact polystyrene wherein polybutadiene having a 1,4-content of at least about 80% is dissolved in styrene monomer and the resulting solution containing from about 1 to about 15 weight percent of polybutadiene based on the weight of polybutadiene plus styrene monomer is polymerized by a thermal process with or without added free radical polymerization initiators, said polymerization being such as to achieve 85 percent or more conversion of the styrene monomer to polymer, the improvement being that at least part of the polybutadiene contains from about 75 to about 300 parts per million by weight of the polybutadiene of an optical brightener selected from the group consisting of aryl substituted triazole substituted aryl coumarins and bis(benzoxazolyl) substituted thiophenes.

2. The process of claim 1 wherein the optical brightener is 7[2H-naphtho(1,2-d-)-triazol-2-yl]-3-phenyl coumarin.

3. The process of claim 1 wherein the optical brightener is 7[5'-methyl-6'-n-butoxy-benzotriazole-(2)]-3 phenyl coumarin.

4. The process of claim 1 wherein the optical brightener is 2,5-bis[5'-tert-butyl benzoxazolyl(2')]thiophene.

5. The process of claim 1 wherein the amount of optical brightener in the impact polystyrene is from about 5 to about 10 parts per million by weight of the impact polystyrene.

* * * * *